Figure 1:
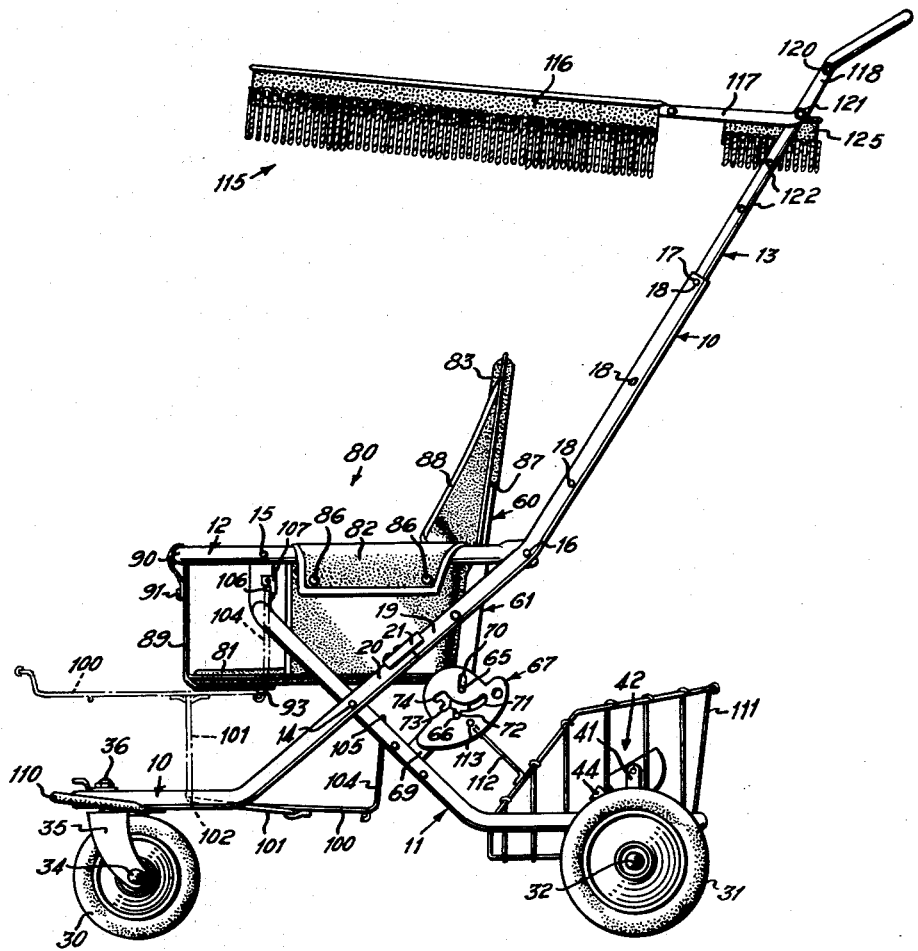

April 26, 1966

D. W. GILL 3,248,125

SLEEPER-WALKER-STROLLER WITH ADJUSTABLE
SEAT, BACKREST AND BRAKE MECHANISM

Filed May 2, 1962

5 Sheets-Sheet 1

INVENTOR.
Donald W. Gill
BY
Wood, Herron & Evans
ATTORNEYS

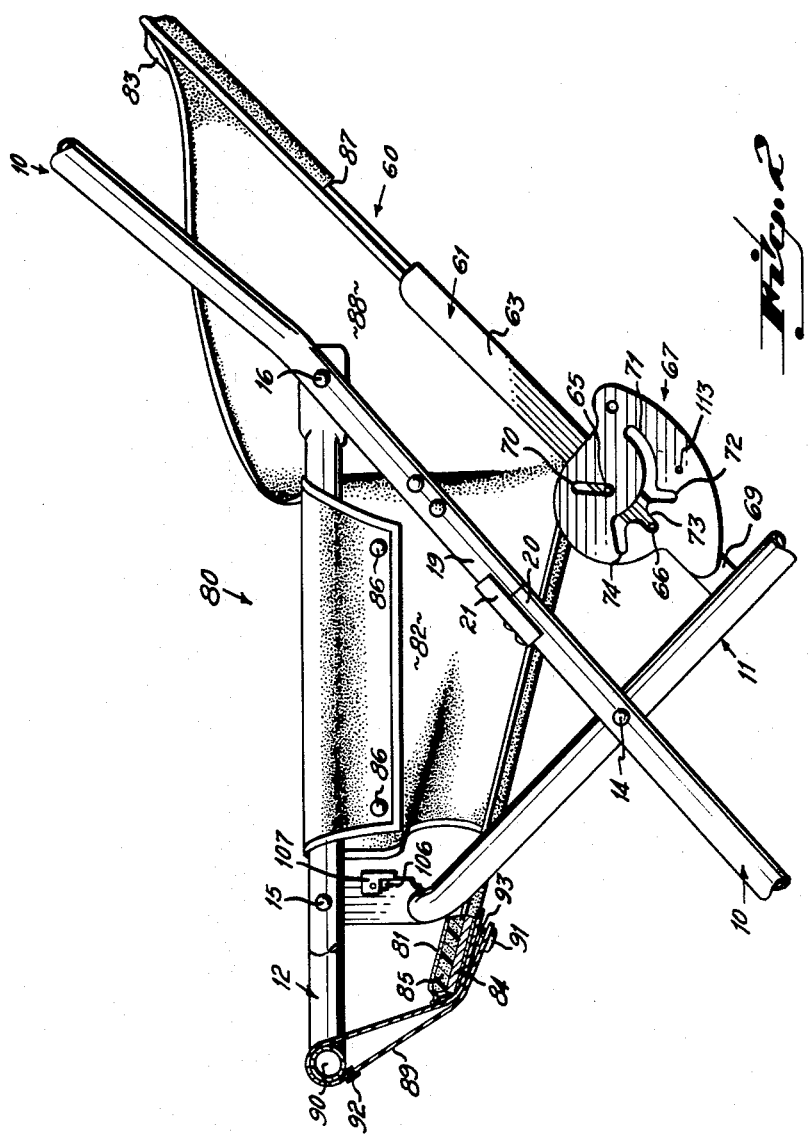

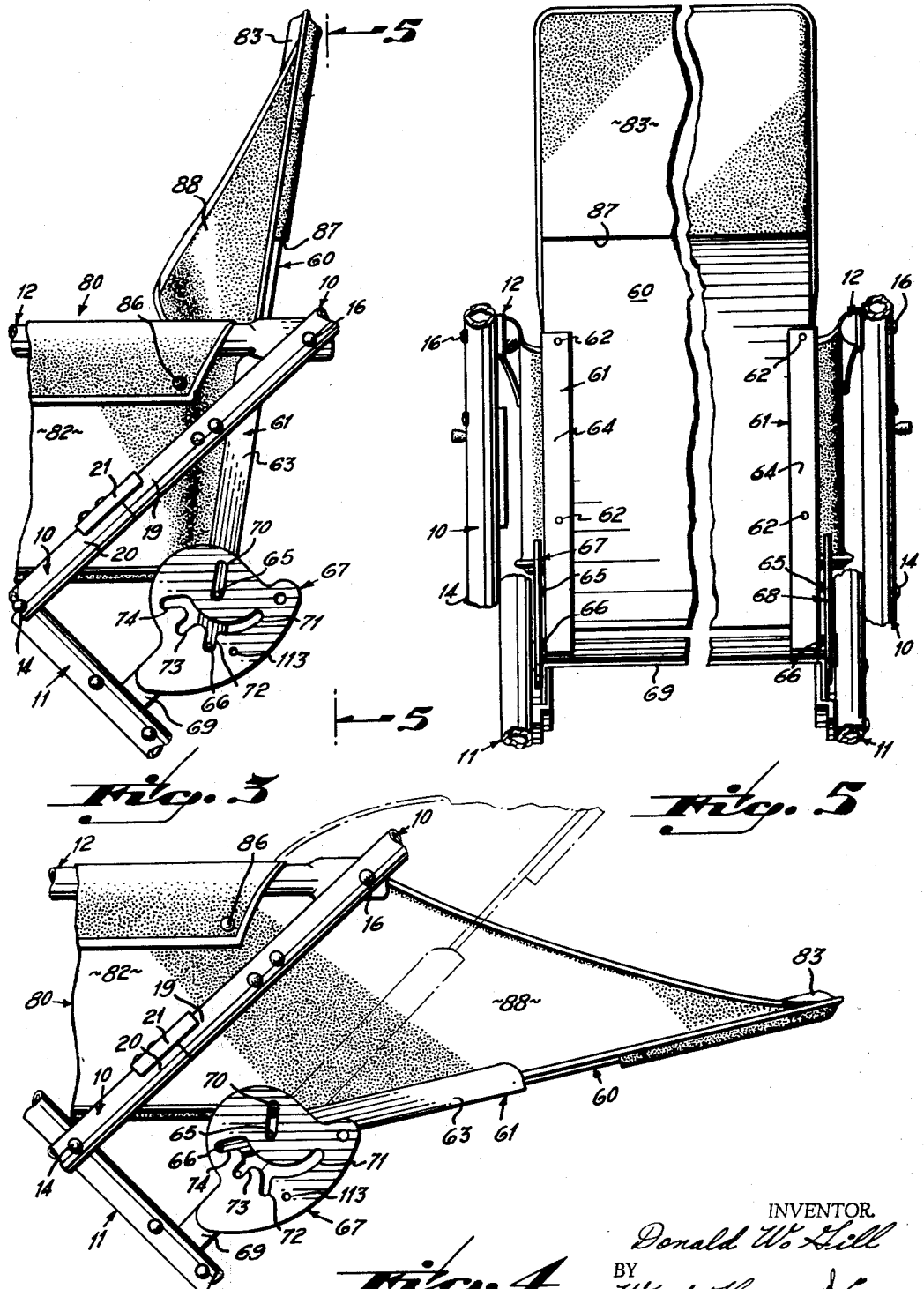

April 26, 1966 D. W. GILL 3,248,125
SLEEPER-WALKER-STROLLER WITH ADJUSTABLE
SEAT, BACKREST AND BRAKE MECHANISM
Filed May 2, 1962 5 Sheets-Sheet 5

INVENTOR.
Donald W. Gill
BY
Wood, Herron and Evans
ATTORNEYS

United States Patent Office 3,248,125
Patented Apr. 26, 1966

3,248,125
SLEEPER-WALKER-STROLLER WITH ADJUSTABLE SEAT, BACKREST AND BRAKE MECHANISM
Donald W. Gill, Cincinnati, Ohio, assignor to The Frank F. Taylor Company, Cincinnati, Ohio, a corporation of Ohio
Filed May 2, 1962, Ser. No. 191,887
6 Claims. (Cl. 280—47.4)

This invention relates to a walker-stroller.

The objective of the invention has been to provide improved features by which to increase the comfort of the child carried in the stroller as well as to enhance the operation and utility of the stroller.

The walker-stroller of this invention includes a frame supported on wheels for rolling and a seat suspended from the frame above the wheels. The seat is equipped with a backrest which is hinged to the frame by a support which permits the back to be inclined through several positions relative to the seat.

Normally walker-strollers are used to transport babies only after they have grown reasonably strong and have graduated from the baby carriage. The present invention, however, may be used to carry quite young babies and may be substituted for the baby carriage. At a young age, a baby does not yet have good muscular control and it is difficult for him to keep himself seated properly in known walker-strollers. As a known stroller is rolled along the ground the vibration created tends to cause the child to slide into an awkward or uncomfortable position. Further, a ride in a stroller will many times cause a small child to fall asleep and known walker-strollers are not adapted to permit a child to sleep in a comfortable position.

One of the objectives of the invention has been to provide a walker-stroller in which the walker-stroller is supported on springs or shock absorbers in order to reduce the vibration and additionally it has been an objective of the present invention to provide a walker-stroller in which the seat panel can be tilted upwardly while the back panel is tilted back so that the child may be comfortably supported in the upwardly directed V formed by the seat panel and the back panel. So supported, a child will not slump uncomfortably in the stroller. The combination of the vibration reducing shock absorbers and the "contoured" or V attitude of the seat provides a more comfortable ride for a baby than has been heretofore attainable.

It has been an objective of this invention to provide a friction lock engageable with one of the wheels to hold the carriage in a selected position, the lock cooperating with the spring suspended wheels so as to be fully operable irrespective of the relative position of the wheels with respect to the frame.

Another objective of this invention has been to provide a back panel hinge-lock support which facilitates the shifting of the backrest inclined positions. The back hinge-lock of this invention also is a more compact and less expensive hinge lock than has been heretofore employed in walker-strollers.

Another objective of this invention has been to provide a footrest which is movable between two positions and which may be easily and conveniently locked in an upper position in which a child lying down in the stroller may rest his feet upon the footrest.

Another objective of this invention has been to provide an inexpensive and novel connection between the canopy and the frame which permits the canopy to be easily removed from the frame and has no tendency to flip up or be blown upward to a position in which it could injure a person pushing a child in the stroller.

Figure 6:
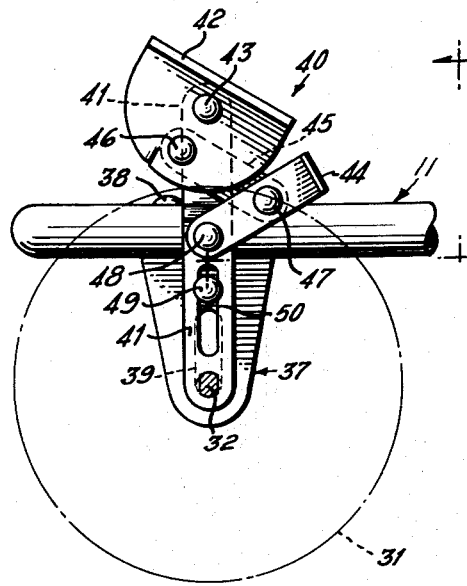
Figure 7:
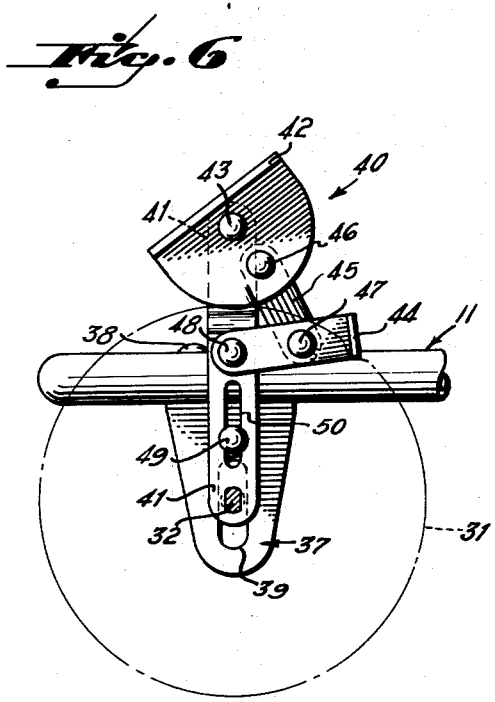
Figure 8:
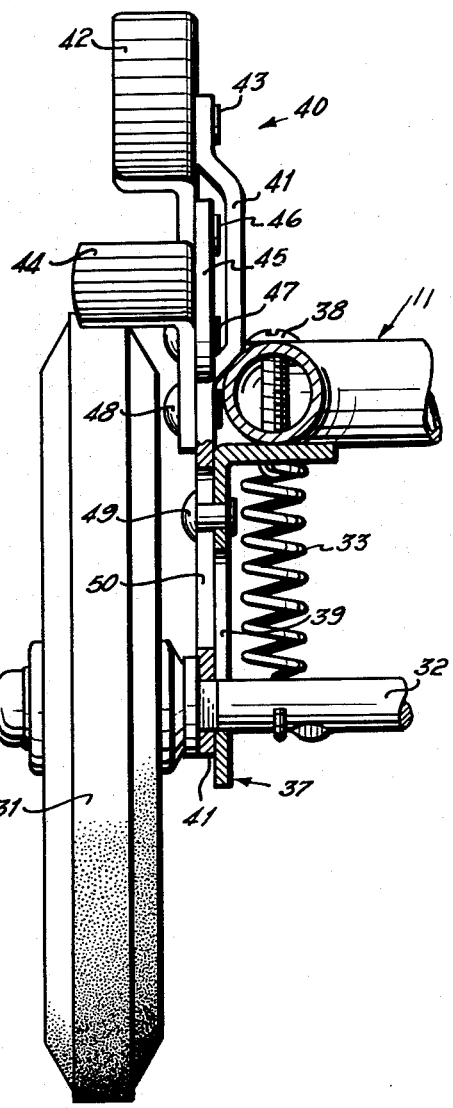
Figure 9:
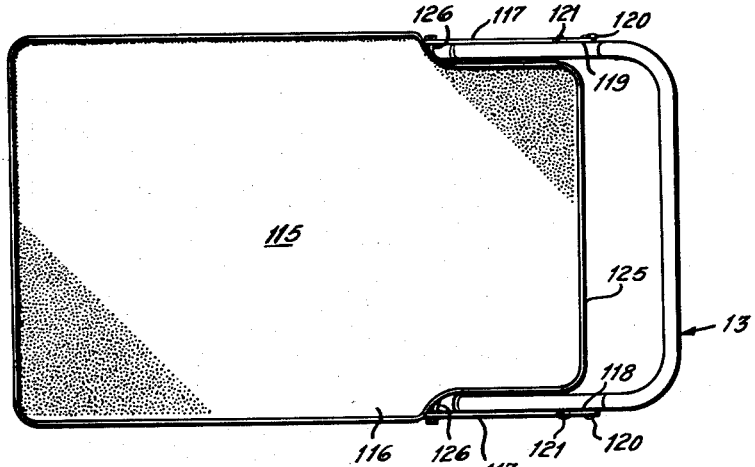
Figure 10:
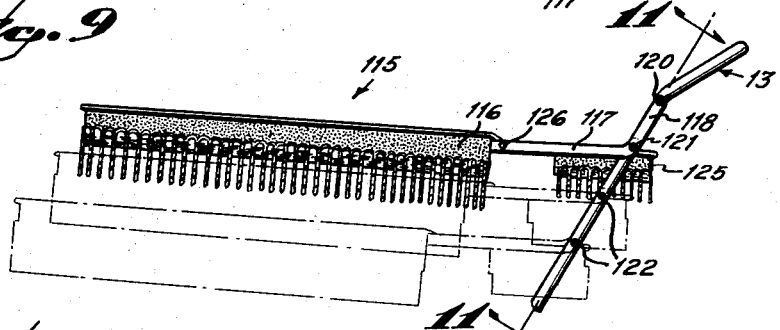
Figure 11:
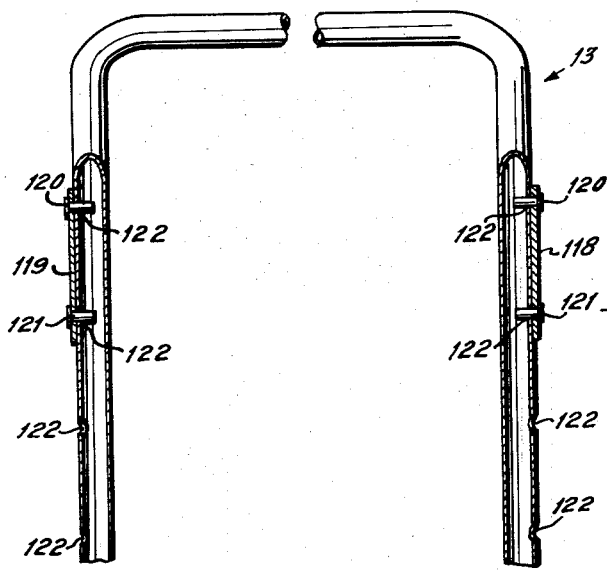

These and other objectives of the invention will become more readily apparent from the following detailed description taken into conjunction with the accompanying drawings in which:

FIGURE 1 is a side elevational view of the walker-stroller of this invention with the backrest in the vertical position and the seat in the horizontal position, FIGURE 2 is a side elevational view of the seat and backrest portion of the stroller with the seat in the inclined position and the backrest in an inclined position, FIGURE 3 is a side elevational view of the seat and backrest with the seat in the horizontal position and the backrest in the vertical position, FIGURE 4 is a side elevational view of the seat and backrest portion of the stroller with the seat in the horizontal position and the backrest in its lowermost position, FIGURE 5 is a rear elevational view of the seat and backrest portion of the stroller taken along the line 5—5 of FIGURE 3, FIGURE 6 is a side elevational view of the brake mechanism in the released position, FIGURE 7 is a side elevational view of the brake mechanism in the locked position, FIGURE 8 is a cross sectional view of the lock mechanism and spring suspension taken along the line 8—8 of FIGURE 6, FIGURE 9 is a top plan view of the canopy and handle of the stroller, FIGURE 10 is a side elevational view of the handle and canopy, FIGURE 11 is a cross-sectional view of the handle and canopy taken along the lines 11—11 of FIGURE 10.

Referring to FIGURE 1 it will be seen that the frame of the stroller consists of an inclined U-shaped front frame member 10, a rear inclined U-shaped member 11, a seat supporting U-shaped member 12, and a telescoping U-shaped handle member 13 received within the tubular side members of the front frame member 10. The front frame member 10 and the rear frame member 11 are pinned together by a pair of rivets 14 at the intersection of the sides of these frame members. The seat supporting frame member 12 is connected to the rear frame member 11 by a pair of rivets 15 and to the front frame member by a pair of rivets 16. These rivet connections permit pivoting of the frame members relative to each other to allow the stroller to be collapsed into a substantially flat package. The handle 13 is telescopically mounted within the ends of the front member 10. At least one arm of the handle is equipped with a detent member 17 adjacent the open end of the U-shaped handle. The detent 17 is adapted to be received in one of a plurality of apertures 18 in the upper portion of the front frame member to selectively lock the handle at any one of several adjusted vertical positions.

Each side portion of the front frame member 10 is made of two sections 19 and 20. The upper section 19 is pivotally connected to a bracket 21 fixedly mounted upon the lower section 20. This pivot connection between the sections 19, 20 of the front frame member 10 permits the upper section 19 having the handle mounted therein to be folded over the seat to collapse the stroller. A lock (not shown) holds the two sections 19, 20 in the unfolded or open position.

The front wheels 30 are independently connected to the front frame member 10 while the rear wheels 31 are mounted upon an axle 32. The axle 32 is connected to the rear frame 11 in such a manner that a pair of compression springs 33 act between the axle 32 and the rear frame 11 and serve as shock absorbers.

Each front wheel 30 is connected by a pin 34 to a yoke shaped bracket 35. The bracket 35 has a conventional vertically extending threaded pin pivotally mounted in the upper section and extending through an aperture in the front portion of the front frame member. The threaded pins are held in the apertures of the frame member by a pair of nuts 36. This type of front wheel assembly which permits the front wheels to turn independently is well known and has not been illustrated in detail.

The rear wheels are resiliently connected to the frame in order that shock will not be transferred directly from the wheels to the frame but will be partially absorbed by the resilient mounting. The rear wheel mountings include the rear axle 32 upon which the rear wheels 31 are rotatably mounted. The axle 32 extends between a pair of identical L-shaped brackets 37. The horizontal leg of each bracket 37 is rigidly connected to the rear frame member 11 by a pair of bolts 38 or other connecting device. The vertically extending portion of each bracket 37 has a vertical slot 39 therein through which the axle 32 extends with the wheels on the axle mounted outside of each bracket. The slots 36 are generally rectangular with the longitudinal axis of the slots extending in the vertical plane so as to permit the axle to move up and down in the slots. Compression springs 33 extend between the lower surface of the horizontal portion of the bracket and the axle 32 so as to bias the axle into a lower position. This arrangement permits the springs to act as shock absorbers whenever the wheels hit an obstruction so that the axle is free to ride upwardly in the slot against the spring bias of the springs 33.

At least one of the rear wheels is equipped with a friction lock 40 which when actuated, is designed to positively hold the stroller in one position. This lock is designed to hold one rear wheel stationary in all positions of the compression spring so that even if a person leans upon the handle forcing the frame downwardly relative to the wheel, the brake will not become disengaged either at the time the weight is placed on the handle or after the weight is removed from the handle. The brake mechanism comprises a supporting bracket 41 mounted upon the axle 32. The supporting bracket extends upwardly from the axle above the wheel and has a foot operator member 42 pivotally connected to the upper portion of the bracket by a rivet 43. The foot operator member 42 is connected to a wheel engaging member 44 by a toggle link 45. The toggle link is connected to the foot operator member 42 and the wheel engaging member 44 by a pair of rivets 46 and 47 respectively. The wheel engaging member 44 is generally L-shaped with one end pivotally connected to the supporting bracket 41 by a rivet 48. The supporting bracket 41 is held in an upright position by a rivet 49 fixedly mounted in the bracket 37 and extending through a vertical slot 50 in the bracket.

Because the supporting bracket 41 is fixedly connected to the axle 32, the frame of the stroller may move up and down without disturbing the setting of the brake. Referring to FIGURES 6 and 7 it will be seen that as the foot operator member 42 is rotated in a counter-clockwise direction on the pivot 43, the wheel engaging member 44 is forced into engagement with the wheel. Upon rotation of the foot operator member 42 in the clockwise direction the wheel engaging member 44 is disengaged from the wheel through the toggle link 45. A mechanical advantage is achieved through the toggle link 45 so that the wheel engaging member 44 is positively locked against the wheel until such time as the foot operator member 42 is manually rotated in the clockwise direction to disengage the wheel engaging member from the wheel.

The backrest of this stroller is adapted to be moved from a vertical position through various inclined positions to a horizontal position so that a child placed within the stroller may be placed in a sitting position, a lying down position, or at least one intermediate position between the sitting up and lying down positions. The backrest consists of a backrest plate 60 having a pair of side brackets 61 rigidly connected thereto as by rivets 62. The brackets each have a side flange 63 and a rear flange 64. Each of the side flanges 63 is equipped with a pair of spaced laterally extending support pins 65, 66 near its lower end. These supporting pins cooperate with slots in a pair of supporting brackets 67, 68 in such a manner as to permit the backrest plate to be moved through several angulated positions and locked in each of these positions.

The brackets 67, 68 are rigidly connected as by welding to a U-shaped bracket 69 which is in turn rigidly connected to the rear frame member 11. The supporting member 69 extends between the two legs of the frame member 11 at a point below the intersection of the front frame member 10 and the rear frame member 11.

The brackets 67, 68 are identical and have a pair of slots therein which cooperate with the supporting pins 65, 66 on the backrest plate to hold the backrest plate in several angular positions. The first of these slots 70 is located above the second slot 71 and accommodates the upper supporting pin 65. The lower slot 71 is arcuate in shape. The radius of the arcuate slot 71 is equal to the distance between the pins 65 and 66 and radii of the slot 71 all pass through a point near the top of the vertical slot 70 so that when the backrest is lifted to a point where the upper supporting pin 65 is in a position at the top of the slot, the backrest may be pivoted through various angular positions with the lower pin 66 riding in the arcuate slot 71. In order to lock the backrest in a selected angular position the arcuate slot 71 has three recesses 72, 73 and 74 extending outwardly and radially therefrom. Thus in order to move the backrest from a vertical position as shown in FIGURE 3 to a horizontal position as shown in FIGURE 4, it is only necessary to lift the backrest so as to move the upper supporting pin 65 to a position in the upper portion of the vertical slot 70 and then the backrest may be pivoted about the supporting pin 65 to a position in which the lower pin engages the forward most recess 74 of the slot 71 to lock the backrest in the horizontal position. Of course the backrest could be locked in as many positions as there are recesses extending outwardly from the arcuate slot 71.

The stroller seat 80 consists of a re-enforced seat portion 81, two side panel sections 82 and a rear panel portion 83. The seat portion 81 is re-enforced by a fiber board 84 (FIGURE 2) which is covered with a fabric or other conventional covering material with the usual foam rubber 85 between the top of the re-enforcing board and the fabric covering. The side panels 82 are made from lateral extensions of the fabric of the seat portion and are designed to be wrapped around the frame member 12 and fastened together by snap-fasteners 86 to hold the stroller seat 80 on the stroller frame. The rear panel portion 83 of the seat is connected to the back plate 60 by a large pocket 87 in the rear of the rear panel portion so as to fit over and down upon the backrest plate 60. Referring to FIGURES 2 and 3, it will be seen that large folds of material 88 are provided between the side panel portions 82 and the lateral edges of the rear panel portion of the seat so as to permit the seat to fold downwardly into a horizontal position.

The seat of the stroller is adjustable from a horizontal position to a position in which the front of the seat is inclined upwardly. This adjustment is provided by a fabric strap 89 sewed or otherwise connected to the bottom of the seat and wrapped around the front crossbar portion 90 of the seat supporting frame 12. The overlying portions of the strap are then locked together by a conventional snap-fastener to hold the strap in a position wrapped around the frame member 12. In order to accommodate adjustment of the seat portion from a horizontal to a slightly inclined position, the strap is provided with a female portion 91 of a snap-fastener near the free end and a pair of spaced male portions 92, 93 of the snap fastener. To hold the seat in the horizontal position, the strap is wrapped around the frame member 12 and the female portion 91 of the snap-fastener is snapped over that male portion which is nearest the end of the strap. To raise the seat portion, the female portion 91 of the snap-fastener is snapped into engagement with the lower-most male portion 93 of the fastener which then holds the seat in an upwardly inclined position. This upward tilting of the seat not only permits a small child to recline comfortably but also is desirable in order to place a young child's feet in an upwardly extending position for feeding purposes so that the child will be able to support a bottle on his stomach and feed himself.

Referring to FIGURE 1, it will be seen that the stroller is equipped with a footrest 100 which is movable from a lower position in which a child seated within the stroller seat may rest his feet upon the footrest to an upper position (shown in phantom in FIGURE 1) in which the child may support his feet on the footrest while in a prone or lying down position. The footrest 100 is connected to the front frame member 10 by a pair of pivot members 101 which at one end 102 are pivotally connected to the front frame member 10 and at the opposite end are pivotally connected to the bottom of the footrest. At the rear of the footrest are a pair of vertically extending rear supports 104 which at their upper end have a laterally extending section section 105. In the lower position of the footrest, the laterally extending portion 105 of the rear supports 104 engages the rear frame member 11 to limit downward movement of the footrest while in the upper position, the laterally extending members 105 fit within horizontal recesses 106 in the upper portion of the rear frame member 11 and are locked therein by latch members 107. The latch members 107 each consist of a vertically slideable yoke shaped member attached to the upper portion of the rear frame member by a pin which passes through a vertical slot (not shown) in the rear frame member. When the latch members 107 are in the upper position, the laterally extending sections 105 of the rear supports 104 may be fitted into the horizontal slots 106 and thereafter the latch members 107 may be moved into their lower positions to lock the laterally extending sections 105 of the footrest within the horizontal slots 106.

The stroller is equipped with the usual rubber bumper 110 which is bolted to the front of the front frame member 10 and extends across the front of the stroller. A wire basket 111 fits within the rear frame member 11 at the rear of the carriage. This basket is supported upon the axle 32 at the rear and in front is supported by a pair of wire supports 112 which are welded or otherwise connected to the lateral sides of the basket and extend into apertures 113 in the supporting brackets 67, 68.

Referring to FIGURES 1, 9, 10 and 11 it will be seen that the stroller is equipped with a canopy 115 connected to the upper portion of the handle 13 in such a manner that the canopy is adjustable to different vertical positions along the handle and may be pivoted backwardly over the handle through an angle of approximately 270° for folding the carriage into a substantially planar package. The canopy consists of a cover 116 which is mounted upon a generally U-shaped canopy frame support 117. The open portion of the canopy frame faces rearwardly with the two rear ends 118 and 119 of the frame being bent upwardly at an angle relative to the remaining generally planar portion of the frame. Each of these rear ends of the canopy frame has a pair of short pins or studs 120, 121 extending therethrough with a portion of the pins extending beyond the inside edge of the end portions 118 and 119. Each lateral side of the handle 13 is equipped with four apertures 122 which are equally spaced along each side of the handle and the same distance apart as the distance between the pins 120, 121 in the end portions 118, 119 of the canopy frame. The pins 120, 121 are fitted within any selected pair of these apertures 122 and hold the canopy in a horizontal position. Thus the canopy is adjustable vertically along the handle by removing the pins from one set of holes and placing them in another set. In addition this canopy mounting has the advantage of holding the canopy in a fixed position and preventing it from inadvertently pivoting about the mounting pins when caught by the wind. However, by pulling outwardly on the lowermost pins while leaving the uppermost pins 120 in the apertures, the canopy may be pivoted over the handle to a position for folding the stroller into a flat package.

The rear section 125 of the canopy cover is connected to an independently movable U-shaped frame member 126. The frame member 126 is pivotally connected at its ends to the canopy frame support 117. Thus this rear section is independently adjustable relative to the remaining portion of the canopy cover so as to provide varying degrees of protection to a child seated within the stroller.

Having described a preferred embodiment of the invention, the operation of this walker-stroller should now be obvious. Before placing a child in the stroller, the angle of inclination of the seat and the backrest are set according to the particular physical capabilities and desires of the child. If the child falls asleep while seated in an upright position, the backrest can be lowered into a horizontal position so as to accommodate him more comfortably. In addition the footrest can be raised so as to support the feet of the child while lying down in the stroller. The child can then be wheeled about in the stroller as desired and the stroller brake can be locked at any time that it is desired to leave the stroller unattended. Because of the manner in which the brake cooperates with the shock absorbing springs on the rear wheels, there is no tendency for the brake to release even though the child may jump around in the stroller or an adult may lean upon the handle and cause the shock absorbing springs to compress. The canopy may also be adjusted vertically along the handle or may be removed depending upon the amount of protection from the sun that is preferred or necessary.

While numerous modifications of the invention illustrated and described in this application will be obvious to those skilled in this art, I do not intend to be limited to the illustrated embodiment of the invention but desire to be limited only by the claims appended hereto.

Having described my invention, I claim:

1. In a child's stroller having a frame, transport wheels mounted upon said frame, a seat carried by said frame, a flexible member connected to the front of said seat, means for connecting said flexible member to said frame in a plurality of positions to adjust the angular position of said seat, a backrest, and means for adjustably securing said backrest to said frame in a plurality of angularly adjusted positions.

2. In a child's stroller having a frame, transport wheels mounted upon said frame, a seat carried by said frame, a flexible member connected to the front of said seat, snap-fastener means for connecting said flexible member to said frame in a plurality of positions to adjust the angular position of said seat, a backrest, and means for adjustably securing said backrest to said frame in a plurality of angularly adjusted positions.

3. In a child's stroller having a frame, transport wheels mounted upon said frame, a seat carried by said frame, a flexible member connected to the front of said seat, means for connecting said flexible member to said frame in a plurality of positions to adjust the angular position of said seat, a backrest, and means for adjustably supporting and securing said backrest to said frame in a plurality of angularly adjusted positions, said backrest supporting means comprising a pair of spaced lugs extending laterally from one side of said backrest and a supporting plate mounted upon said frame, said supporting plate having an arcuate slot and a linear slot extending in a direction generally radially of said arcuate slot, said arcuate slot having a plurality of recesses extending outwardly therefrom, said lugs being mounted within said slots for movement therein to adjust the angular position of said backrest.

4. In a child's stroller having a frame, transport wheels mounted upon said frame, a seat carried by said frame, a flexible member connected to the front of said seat, means for connecting said flexible member to said frame in a plurality of positions to adjust the angular position of said seat, a backrest, means for adjustably securing said backrest to said frame in a plurality of angularly adjusted positions, a footrest, means for supporting said footrest on said frame for movement from a first position substantially below said seat to a second position generally in the plane of said seat, and latch means for securing said footrest to said frame in the second position.

5. In a child's stroller having a frame, transport wheels mounted upon said frame, a seat carried by said frame, means for adjusting the angulation of said seat and securing it in an adjusted position whereby the front of said seat may be raised from a position in which it is located in the horizontal plane of the back portion of the seat to a position in which it is located above the horizontal plane of said back portion, a back rest, means for adjustably securing said back rest to said frame in a plurality of angularly adjusted positions, said frame including a pusher handle extending above and behind said seat, a canopy mounted on said frame adjacent said handle, said canopy including a substantially planar U-shaped frame and a cover over said canopy frame, said canopy frame having end portions extending at an angle to the planar portion of said frame, said end portions each having a pair of protrusions extending laterally therefrom and adapted to be received in a pair of apertures in said pusher handle whereby said canopy is held against pivotal movement on said frame by said protrusions.

6. In a child's stroller having a frame, a seat carried by said frame, a pair of transport wheels mounted on the front of said frame, a pair of rear wheels mouned upon an axle, a pair of laterally spaced bracks mounted on said frame, each of said brackets having vertical slots therein, said axle being located within said slots and free for vertical movement relative to said frame, resilient compressible shock absorber means located between said frame and said axle, and friction brake means including a member engageable with one of said rear wheels to hold said stroller in a fixed position, a toggle link connected at one end to said member, said toggle link being connected at its opposite end to a pivotally mounted foot operated member, said rear wheel engageable member being pivotally mounted relative to said axle for movement into and out of engagement with said rear wheel and being fixedly mounted relative to said axle and movably mounted relative to said frame and brackets when engaged with said wheel whereby said brake will remain engaged with said wheel independent of movement of said axle and rear wheels relative to said frame.

References Cited by the Examiner
UNITED STATES PATENTS

| | | | |
|---|---|---|---|
| 660,479 | 10/1900 | Wright | 296—57 |
| 2,114,725 | 4/1938 | Seibert et al. | 280—36 |
| 2,208,691 | 7/1940 | Voth | 296—56 X |
| 2,316,100 | 4/1943 | Nelson | 297—5 |
| 2,341,117 | 2/1944 | Reinholz | 280—41 X |
| 2,531,933 | 11/1950 | Clark | 280—124 X |
| 2,642,924 | 6/1953 | Gill | 280—36 |
| 2,770,488 | 11/1956 | Kuniholm et al. | 296—107 |
| 2,783,053 | 2/1957 | Sheldrick et al. | 280—47.4 X |
| 2,798,730 | 7/1957 | Smith | 280—47.4 X |
| 2,872,203 | 2/1959 | Hedstrom | 280—47.4 X |
| 2,886,337 | 5/1959 | Quisenberry | 280—36 |
| 2,972,488 | 2/1961 | Alsop | 280—47.37 |
| 2,982,562 | 5/1961 | Gladstein | 280—47.41 X |
| 3,029,087 | 4/1962 | Alsop | 280—47.37 |
| 3,061,328 | 10/1962 | Konar | 280—36 |

A. HARRY LEVY, *Primary Examiner.*